No. 752,465. PATENTED FEB. 16, 1904.
G. J. NOTH.
GRAIN VALVE.
APPLICATION FILED SEPT. 21, 1903.
NO MODEL.
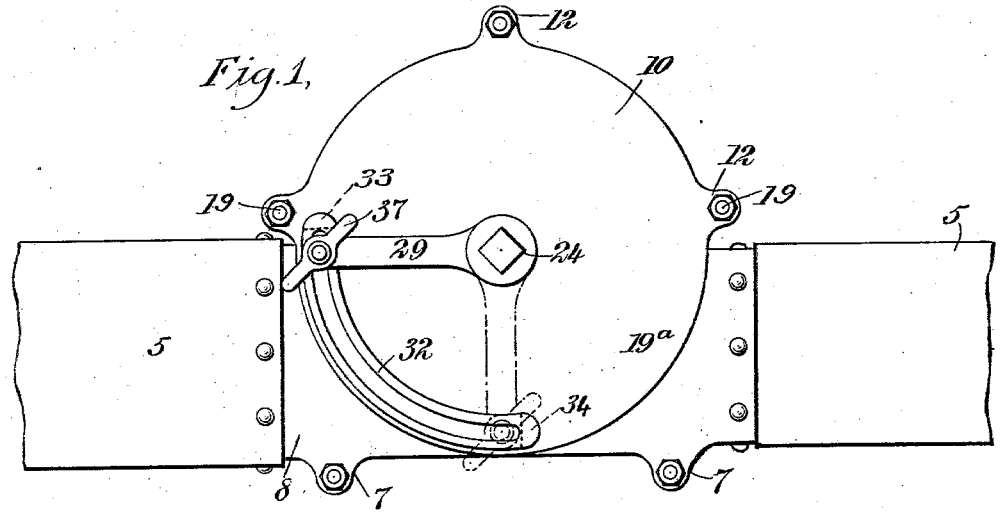
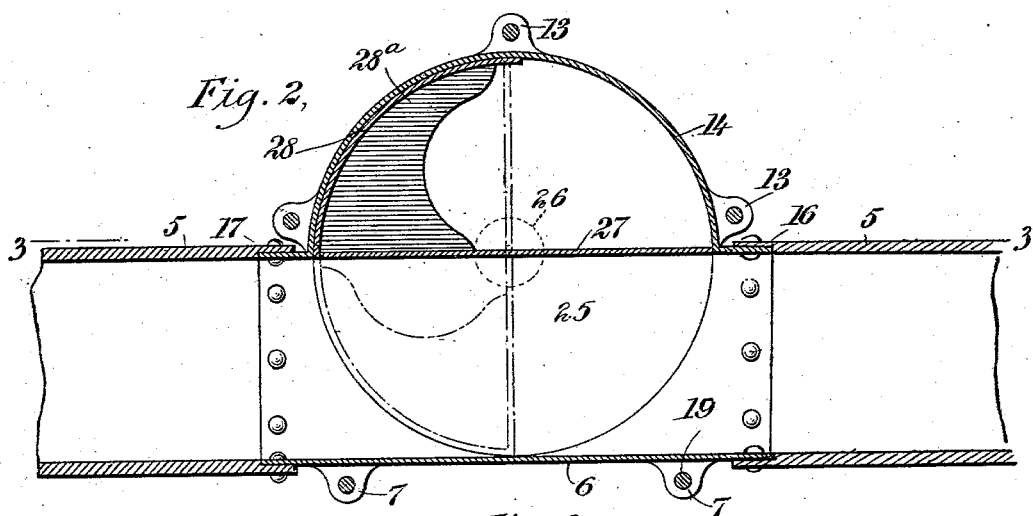
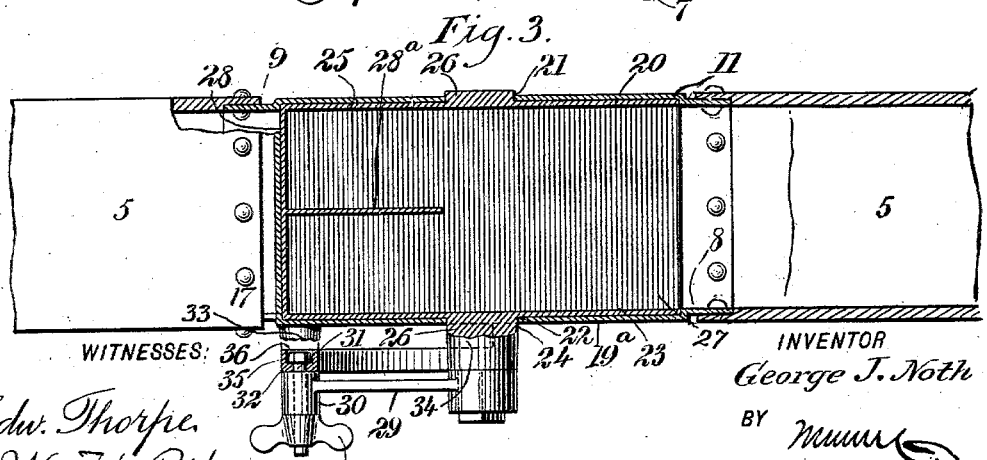
WITNESSES:
Edw. Thorpe.
W. H. Reid.
INVENTOR
George J. Noth
BY
ATTORNEYS No. 752,465. Patented February 16, 1904.

UNITED STATES PATENT OFFICE.

GEORGE JOSEPH NOTH, OF DAVENPORT, IOWA.

GRAIN-VALVE.

SPECIFICATION forming part of Letters Patent No. 752,465, dated February 16, 1904.

Application filed September 21, 1903. Serial No. 174,009. (No model.)

*To all whom it may concern:*

Be it known that I, GEORGE JOSEPH NOTH, a citizen of the United States, and a resident of Davenport, in the county of Scott and State of Iowa, have invented a new and Improved Grain-Valve, of which the following is a full, clear, and exact description.

This invention relates to the class of valves used to control the passage of dry substances, such as wheat or corn, in small fragments or particles.

The object of the invention is to provide a form of valve or gate that will not have a shearing or crushing action on the material, and thereby avoid breaking the grains or smashing them.

My invention, broadly stated, comprises a rotary valve having a concave or cylindrical valve-gate that will enter the stream of grain or the like flowing through the pipe and pass through it at an angle that diminishes as the passage-way becomes closed.

With these objects in view and others my invention comprehends the construction and arrangement of parts substantially as hereinafter described, and particularly pointed out in the claims.

Reference is to be had to the accompanying drawings, forming a part of this specification, in which similar characters of reference indicate corresponding parts in all the views.

Figure 1 is a side elevation of a device embodying my invention. Fig. 2 is a vertical section showing the gate of the valve open; and Fig. 3 is a horizontal section, with the gate in closed position, certain parts being shown in plan.

In the drawings the reference-numeral 5 represents a pipe or conduit, shown as rectangular in cross-section. The pipe-sections 5 5 are connected to a box or valve-body comprising a bottom plate 6, having apertured ears 7 7, side members 8 9, respectively having semicircular extensions 10 11 projecting above the top of the pipe-sections, which extensions have apertured ears 12 13, and a semicylindrical top plate 14, having extending end portions 16 17, by which the top is secured to the pipe-sections. Bolts 19 19 connect the said opposite ears 7 7 and 12 13 and serve to support and strengthen the valve-body.

The side members, respectively, have outwardly-offset circular members $19^a$ 20, that contain opposite central apertures 21 22. In one side member rotates a disk 23, having a hub 24, engaging the walls of the aperture 22. In the other side member rotates a disk 25, having a hub 26, that rotates in the aperture 21. A plate 27 connects the said disks 23 and 25 at a right angle with each other and on a diameter thereof. A plate 28 of the shape of one-fourth of a cylinder extends from the periphery of one disk to the other and at one end is joined with one end of the diameter-plate 27. A somewhat sector shaped plate $28^a$ is secured to the middle of the diameter-plate 27 and also to the middle of the curved plate 28 and serves to brace and strengthen plate 28 at its middle portion and also at its free end not connected with the diameter-plate 27.

The gate of the valve comprising the said members—disks 23 and 25, diameter-plate 27, quadrant cylindrical plate 28, and sector-plate $28^a$—thus rotates on the bearings of the hubs 24 26. As a convenient means for rotating this gate I provide a radial arm 29, secured to the hub 24 outside of the casing and having an apertured boss 30, that carries a clamp-bolt 31. A curved bar 32 is connected with the casing by lugs 33 34 and has a slot 35 therein that is concentric with the gate. The clamp-bolt 31 projects through the slot 35, with its head in the inner enlarged portion 36 of the slot 35. Thus the arm 29 and gate may be secured in various positions of adjustment.

The operation of the gate is as follows: When the parts are in the position shown in Figs. 1 and 2, the passage-way through the valve-casing is open and, it will be observed, entirely unobstructed, having a cross-sectional area at all portions equally as great as that of the pipe-sections 5 5, and, furthermore, there will be no openings or ledges of any kind to impede the free passage of the grain through the valve or to abrade or bruise the grains. The diameter-plate 27 is exactly flush with the upper plate of the valve-casing, the quadrant-plate 28 being now in the extension of the casing and the side disks 23 and 25 of the gate being located in corresponding offset portions of the sides of the casing. The gate can be clamped in this position by tightening the wing-nut 37 on the bolt 31. To close the gate, either partially or entirely, the nut 37 is loosened and the arm 29 moved downward, which will bring the plates 27 and 28 to the position as indicated in broken lines in Fig. 2. During this movement it will be noticed that the plate 27 will not cross the path of the grain through the casing at a right angle during its entire movement, but that while it first strikes the grain at a right angle this angle gradually decreases as it moves through an arc of ninety degrees until it is moving parallel with said path at its small portion of movement to the final position at a right angle to the passage-way.

The pressure of the grain on the gate is not on a gate having a plane surface, but on the quadrant-cylinder 28, which is strongly braced by the disks 23 25, diameter-plate 27, and sector-plate 28ª. During this movement the clamp-bolt will slide in the slot in the bar 32 to the other end of the slot, when the gate can be clamped in the closed position by the wing-nut 37. Obviously the gate may be clamped in any position between closed and full open. To open the gate, the arm 29 is simply moved in the reverse direction, and since the quadrant-plate travels through an arc there will be no friction on the grain tending to crush the same nor any ledge or edge to injure the same.

It will be observed that it is practically impossible for the grain or other material to work out around the hubs 25 and 26, because it would have to force its way first around the periphery of the disk 23 (or 25) and then pass the whole radial distance between the tightly-fitting disks and the casing before it could escape between the hub and its supporting bearing portion of the casing.

Having thus described my invention, I claim as new and desire to secure by Letters Patent—

1. A valve of the character described, consisting of a valve-body having a semicircular extension at the top, the sides of the body being formed with outwardly-projecting circular offsets, said offsets being apertured, a valve in said body and consisting of two disks, one in each offset and each provided with a hub projecting into the opening of the offset, a diametrically-disposed plate connecting the disks, a curved plate extending between the disks from the diameter-plate, and a plate secured to the center of the diameter and curved plate, an arm on the hub of one disk, and means for locking the arm in position, as set forth.

2. A valve of the character described, consisting of a valve-body having a semicircular extension at the top, the sides of the body being formed with outwardly-projecting circular offsets, the offsets being provided with openings, a valve in said body and comprising two disks one in each offset and each provided with a hub projecting into the opening of the offset, a diametrically-disposed plate connecting the disks, and a curved plate extending between the disks from the diameter-plate, and means connected with the hub of one disk for operating the valve, as set forth.

3. In a valve, a body having offsets in its sides and a passage therethrough, and a gate comprising a pair of disks one in each offset, a cylindrical plate joining the disks for a portion of their periphery, and means for supporting the gate, so as to rotate and close the said passage-way.

4. In a valve, a body having a passage-way therethrough and an opening at one side, closed by a semicylindrical casing, the body and casing having offset sides and a gate comprising a pair of disks one in each offset connected by a cylindrical plate, the gate being supported so as to rotate in the passage-way and casing and close the same by its cylindrical plate.

5. In a valve, a body having a passage-way therethrough, a gate comprising a pair of disks connected by a cylindrical plate, a diametrically-disposed plate connecting the disks and one end of said plate, and a sector-shaped plate disposed between the said plates at their middle portions, the gate being supported so as to rotate in the passage-way and close the same by its cylindrical plate.

In testimony whereof I have signed my name to this specification in the presence of two subscribing witnesses.

GEORGE JOSEPH NOTH.

Witnesses:
 EDW. J. DAHMS,
 MAMIE DAHMS.